US008494465B2

(12) United States Patent
Wymant et al.

(10) Patent No.: US 8,494,465 B2
(45) Date of Patent: Jul. 23, 2013

(54) SYSTEM AND METHOD FOR PROVIDING INDEPENDENT POLARIZATION CONTROL

(75) Inventors: Nicholas Wymant, Fitzroy (AU); Charles Williams, Ferntree Gully (AU)

(73) Assignee: Alcatel Lucent, Paris (FR)

( * ) Notice: Subject to any disclaimer, the term of this patent is extended or adjusted under 35 U.S.C. 154(b) by 98 days.

(21) Appl. No.: 13/082,995

(22) Filed: Apr. 8, 2011

(65) Prior Publication Data

US 2011/0300792 A1 Dec. 8, 2011

(30) Foreign Application Priority Data

Apr. 9, 2010 (EP) .................................... 10290197

(51) Int. Cl.
*H01Q 11/12* (2006.01)
*H04B 1/04* (2006.01)

(52) U.S. Cl.
USPC ............................ 455/121; 455/103; 455/129

(58) Field of Classification Search
USPC .. 455/120–121, 103, 114.2, 129, 91; 343/756
See application file for complete search history.

(56) References Cited

U.S. PATENT DOCUMENTS

| | | | | |
|---|---|---|---|---|
| 3,742,506 | A | 6/1973 | Wilkinson | |
| 4,737,793 | A | 4/1988 | Munson et al. | |
| 6,356,771 | B1 | 3/2002 | Dent | |
| 2007/0191074 | A1 * | 8/2007 | Harrist et al. | 455/572 |

FOREIGN PATENT DOCUMENTS

| | | | |
|---|---|---|---|
| JP | 59101904 | A | 6/1984 |
| WO | WO 2005/062476 | A1 | 7/2005 |

OTHER PUBLICATIONS

European Search Report for EP 10290197.2 dated Jul. 22, 2010.

* cited by examiner

*Primary Examiner* — Christian Hannon
(74) *Attorney, Agent, or Firm* — Fay Sharpe LLP

(57) ABSTRACT

A system for providing independent polarization control in a radio communication system comprises a set of common antennas and a plurality of transmitters for supplying signals to said set of common antennas Said set of common antennas is used for transmitting signals supplied by the transmitters. Said set of common antennas is used to provide elliptical polarization transmission of said signals. The system furthermore comprises a combiner for each combination of a first transmitter of said plurality of transmitters and an antenna of said not of common antennas, and an adjusting element allowing for controlling the polarization of the signal provided by said first transmitter.

9 Claims, 3 Drawing Sheets

SYSTEM AND METHOD FOR PROVIDING INDEPENDENT POLARIZATION CONTROL

CROSS-REFERENCE

This application is based on European Patent Application No. 10290197.2 filed on Apr. 9, 2010, the disclosure of which is hereby incorporated by reference thereto in its entirety, and the priority of which is hereby claimed under 35 U.S.C. §119.

TECHNICAL FIELD

The present invention relates to radio communication techniques.

BACKGROUND

In the following section aspects will be introduced that may be helpful in facilitating a better understanding of the invention. Accordingly, the statements of this section are to be read in this light and are not understood as admission about what is in the prior art or what is not in the prior art.

For transmission to handheld devices, broadcasters plan to transmit signals with an added vertically polarized component in addition to the typically used horizontally polarized transmission for fixed devices.

There is considerable debate and uncertainty concerning the optimum ratio of energy that should be transmitted in these two polarizations.

Different broadcasters plan to use ratios ranging from 0% Vertical/100% Horizontal (linear polarization) through to 50% Vertical/50% Horizontal (circular polarization). Polarization ratios between these two extremes and with a quadrature phase relationship are known as elliptical polarization.

In today's broadcasting systems, the ratio of the vertical component compared to the horizontal component is fixed and determined by the antenna element design and/or the antenna element interconnecting cables.

Because of the determination at antenna design, it cannot be easily changed after manufacture and installation.

SUMMARY

In some applications, antennas with separate inputs to vertical and horizontal radiators have been used, and by adjusting the ratio of power applied to each input, the ratio of polarizations can be changed.

An example of this technology is shown in FIG. 1.

There an exemplary set of antennas and its Connection Point 100 is shown.

The antenna se comprises one or more vertically polarized antennas and one or more horizontally polarized antennas. Vertically polarized antennas receive their signals to be transmitted via a respective port A and horizontally polarized antennas receive their signals to be transmitted via a respective port B or vice versa.

Signals from one or more Transmitters denoted TX1, TX2, TX2, TX4 are fed via respective Combiners C1, C2, C3, C4 in a common Feeder towards a Power Splitter 120 having a fixed ratio. From there the power split signals are fed towards a vertical input and a horizontal input in the Connection Point 100 of the antenna.

A plurality of Combiners C1, C2, C3, C4 may be grouped in a Group Combiner 130.

The location of the Power Splitter 120 may be nearby the Connection Point 100, nearby the Combiner C1/Group Combiner 130 or somewhere in between the Connection Point 100 and the Combiner C1/Group Combiner 130.

A combiner C1, C2, C3, C4 may comprise individual filter elements that allow each service provider, e.g. a television transmitter on a certain channel, to be combined on to a transmission line and antenna system. The filters provide isolation so that each service provider/transmitter operates as thought it alone is connected to the antenna.

Within this example. the polarization ratio is set for any signal. I.e., irrespective of the preferences of a single service provider, all signals will experience the same polarization ratio.

This leads to a situation where either all service provider need to agree to a certain polarization ratio or some of the service provider may choose not to use a set of antenna since their preferences are incompatible to the preferences of the other service providers.

Another example is as follows and will be described again with respect to FIG. 1.

There an exemplary set of antennas and its Connection Point 100 is shown.

The antenna set comprises one or more antennas slanted at +45 degrees with respect to the horizontal polarization and one or more antennas slanted at −45 degrees with respect to the horizontal polarization. +45 degree slanted antennas receive their signals to be transmitted via a respective port A and −45 degree slanted antennas receive their signals to be transmitted via a respective port B or vice versa.

A Power Splitter 120 splits the power into two equal portions. Both portions are fed towards the Connection Point 100, however, the feeding of the individual portions has unequal length transmission lines between the Power Splitter 120 and the Connection Point 100. The result of the unequal transmission line is a phase shift. Hence Box 110 may be a phase shifter operating either on one of the signal portions or operating on both but in a different manner.

The location of the Power Splitter 120 may be nearby the Phase Shifter 110, nearby the Combiner C1/Group Combiner 130 or somewhere in between the Phase Shifter 110 and the Combiner C1/Group Combiner 130.

The location of the Phase Shifter 110 may be nearby the Connection Point 100, nearby the Power Splitter 120 or somewhere in between the Connection Point 100 and the Power Splitter 120.

Feeding the slanted antennas with the signals will cause he antenna to radiate both vertically polarized and horizontally polarized components.

The ratio between these components is controlled by the Phase Shifter 110.

Within this example, the polarization ratio is set for any signal. I.e., irrespective of the preferences of a single signal provider, all signals will experience the same polarization ratio.

This leads to a situation where either all signal provider need to agree to a certain polarization ratio or some of the signal provider may choose not to use a set of antenna since their preferences are incompatible to the preferences of the other service providers.

All of the above methods suffer from the major drawback that the polarization ratio, once selected, must be the same for all signal suppliers, i.e. all broadcasters.

It is thus an object of the invention to overcome one or more problems as can be derived from the above or to provide alternative methods and/or systems to the ones known.

The invention proposes a system for providing independent polarization control in a radio communication system. The system comprises a set of common antennas and a plurality of transmitters for supplying signals to said net of common antennas. Said set of common antennas is used for transmitting signals supplied by the transmitters. Said set of common antennas is used to provide elliptical polarization transmission of said signals. The system furthermore comprises a combiner for each combination of a first transmitter of said plurality of transmitters and an antenna of said set of common antennas, and an adjusting element allowing for controlling the polarization of the signal provided by said transmitter.

In a further embodiment of the system according to the invention said adjusting element allows for controlling the polarization via controlling a power ratio supplied to each of said combiner.

In an alternative embodiment of the system or an enhancement to said further embodiment of the system, said adjusting element allows for controlling the polarization via controlling a phase shift supplied to one of said combiners.

In a further embodiment of the system according to the invention, the polarization is controlled in such a way that the polarization of at least one signal transmitted by the set of common antennas provides an elliptical polarization.

In a still further embodiment of the system according to the invention, the polarization is controlled in such a way that the polarization of at least one signal transmitted by the set of common antennas provides a horizontal component and a vertical component, wherein the power of said signal in the horizontal component is about 66% and the power of said signal in the vertical component is about 33%.

Furthermore a method for providing independent polarization control in a radio communication system is proposed within the invention. There, the system comprises a plurality of transmitters for supplying signals to a set of common antennas. Said set of common antennas is used for transmitting signals supplied by the transmitters. Said set of common antennas is used to provide elliptical polarization transmission of said signals. The method comprises the step of providing a combiner for each combination of a first transmitter of said plurality of transmitters and an antenna of said set of common antennas. Furthermore, said method comprises the step of providing an adjusting element allowing for controlling the polarization of the signal provided by said transmitter.

In a further embodiment of the invention said adjusting element allows for controlling the polarization via controlling a power ratio supplied to each of said combiner.

In an alternative embodiment or an enhancement to said further embodiment said adjusting element allows for controlling the polarization via controlling a phase shift supplied to one of said combiners.

These and other aspects of the invention will be apparent from and elucidated with reference to the embodiments described hereinafter.

Some embodiments of systems and/or portions thereof and/or methods in accordance with embodiments of the present invention are now described, by way of example only. and with reference to the accompanying drawings, in which:

BRIEF DESCRIPTION OF THE DRAWINGS

In FIG. 2 an exemplary arrangement is schematically illustrated. There an exemplary set of antennas and its Connection Point 100 is shown.

DETAILED DESCRIPTION

Figure 1:
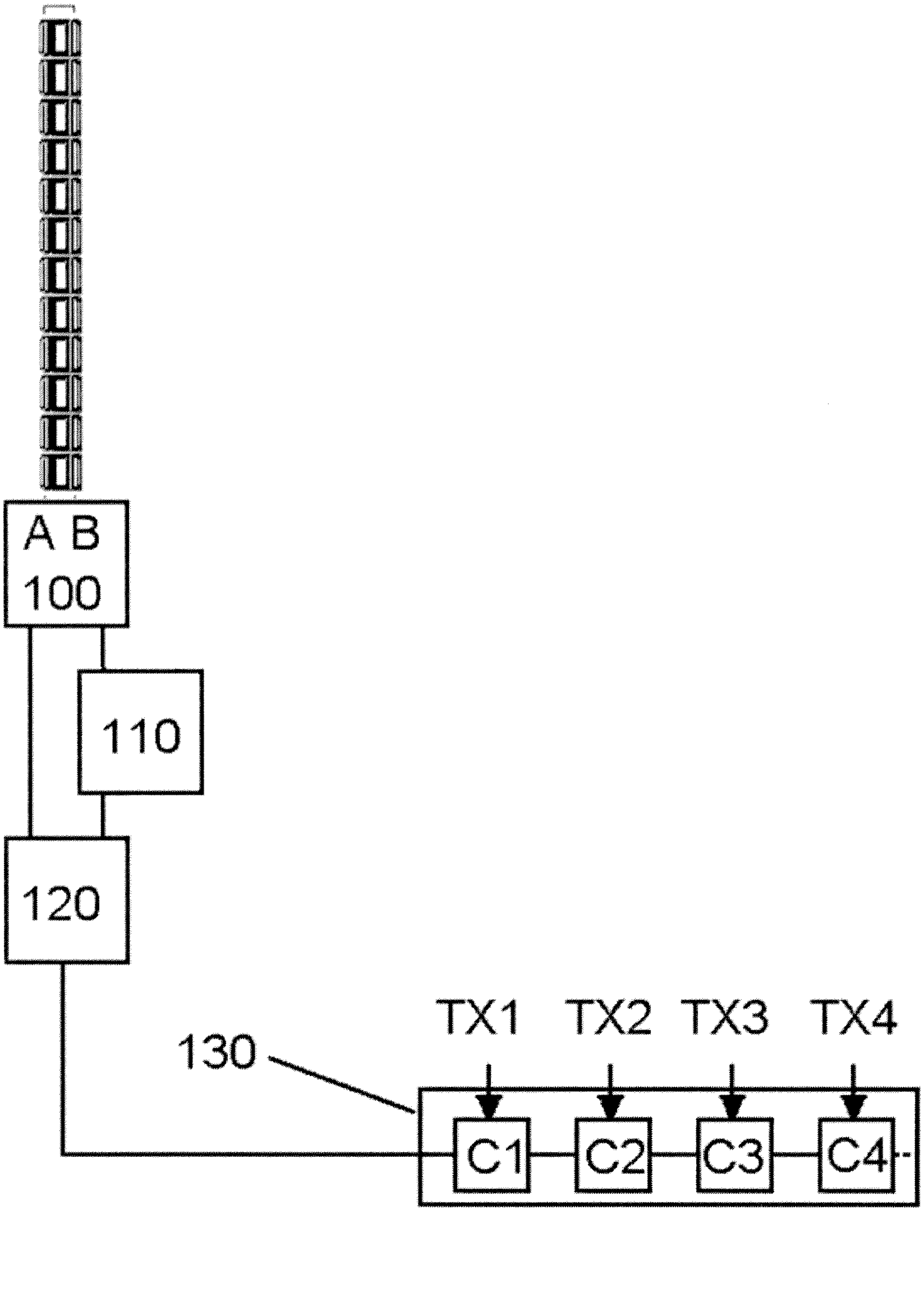
FIG. 1 schematically illustrates an example of technology to illustrate background of the invention.

The antenna set comprises in a first embodiment one or more vertically polarized antennas and one or more horizontally polarized antennas. Vertically polarized antennas receive their signals to be transmitted via a respective port A and horizontally polarized antennas receive their signals to be transmitted via a respective port B.

Signals from one or more Transmitters denoted TX1, TX2, TX2, TX4 are fed towards the set of antennas and its Connection Point 100.

An antenna may consist of one or more radiation elements.

According to the invention a combiner for each combination of a transmitter and an antenna is provided.

I.e., signals originating from a first Transmitter TX1 will be combined with other signals via combiners C1 and C5. Combiner C1 combines signals to be transmitted via the horizontally polarized antenna or set of horizontally polarized antennas. Combiner C5 combines signals to be transmitted via the vertically polarized antenna or set of vertically polarized antennas.

In a corresponding manner, signals originating from a further Transmitter TX2 may be combined with other signals via combiners C6 and C2. Combiner C2 combines signals to be transmitted via the horizontally polarized antenna or set of horizontally polarized antennas. Combiner C6 combines signals to be transmitted via the vertically polarized antenna or set of vertically polarized antennas.

The same may be done with signals originating from further transmitters as indicated by Transmitters TX3 and TX4 and respective combiners C3, C7 for TX3 and C4, C8 for TX4.

Signals for the vertically polarized antenna or set of vertically polarized antennas are fed via a common vertical fed towards a vertical input and (Port A) in the Connection Point 100 of the antenna while the horizontally polarized antenna or set of horizontally polarized antennas is fed via a common horizontal fed towards a horizontal input and (Port B) in the Connection Point 100 of the antenna.

Signals supplied to the Combiners C1 and C5 are received via a Power Splitter 10 having an adjustable ratio. The signals supplied to the Combiners C2 and C6 are received via a Power Splitter 11 having an adjustable ratio. The signals supplied to the Combiners C3 and C7 are received via a Power Splitter 12 having an adjustable ratio. The signals supplied to the Combiners C4 and C8 are received via a Power Splitter 13 having an adjustable ratio.

A plurality of Combiners C1, C2, C3, C4 may be grouped in a first Group Combiner 230 and another plurality may be grouped in a second group combiner 330. It is to be understood that any combination of individual and group combiners may be used and that the invention is not limited to a particular amount of combiners and/or group combiners.

The location of the Power Splitter 10 may be nearby the Combiners C1 and C5, nearby the first Transmitter TX1 or somewhere in between the Combiners C1 and C5 and the Transmitter TX1.

Again, a combiner C1, C2, C3, C4, C5, C6, C7, C8 may comprise individual filter elements that allow each service provider, e.g. a television transmitter on a certain channel, to be combined on to a transmission line and antenna system.

The filters provide isolation so that each service provider/transmitter operates as though it alone is connected to the antenna.

Within this example, the polarization ratio may be set for each signal individually. I.e. signals originating from the first Transmitter TX1 may be split by the Power Splitter 10 equally, leading to a circular polarization, while signals originating from the further Transmitter TX2 may be split by the Power Splitter 11 in a 66%/33% manner, leading to an elliptical polarization. Signals originating from Transmitter TX3 may be split by the Power Splitter 12 in a 100%/0% manner, leading to a linear polarized signal, e.g. a horizontally polarized signal, while signals originating from Transmitter TX4 may be split by the Power Splitter 13 in a 0%/100% manner, leading to a linear polarized signal, e.g. a vertically polarized signal.

It is to be understood that the respective splitting ratios are only of exemplary nature. In case only a particular polarization is needed, a respective power splitter and a respective unused combiner may even be omitted and instead the signal may be combined with other signals of the respective feed only. Furthermore, it may also be envisaged that fixed ratio Power Splitters may be used for certain signals while others use adjustable Power Splitters.

As a result, any service provider may choose a polarization on its own, leading to an increase of freedom for the service providers while reducing the number of antennas which would be necessary when only a fixed ratio would be available for all.

Figure 2:
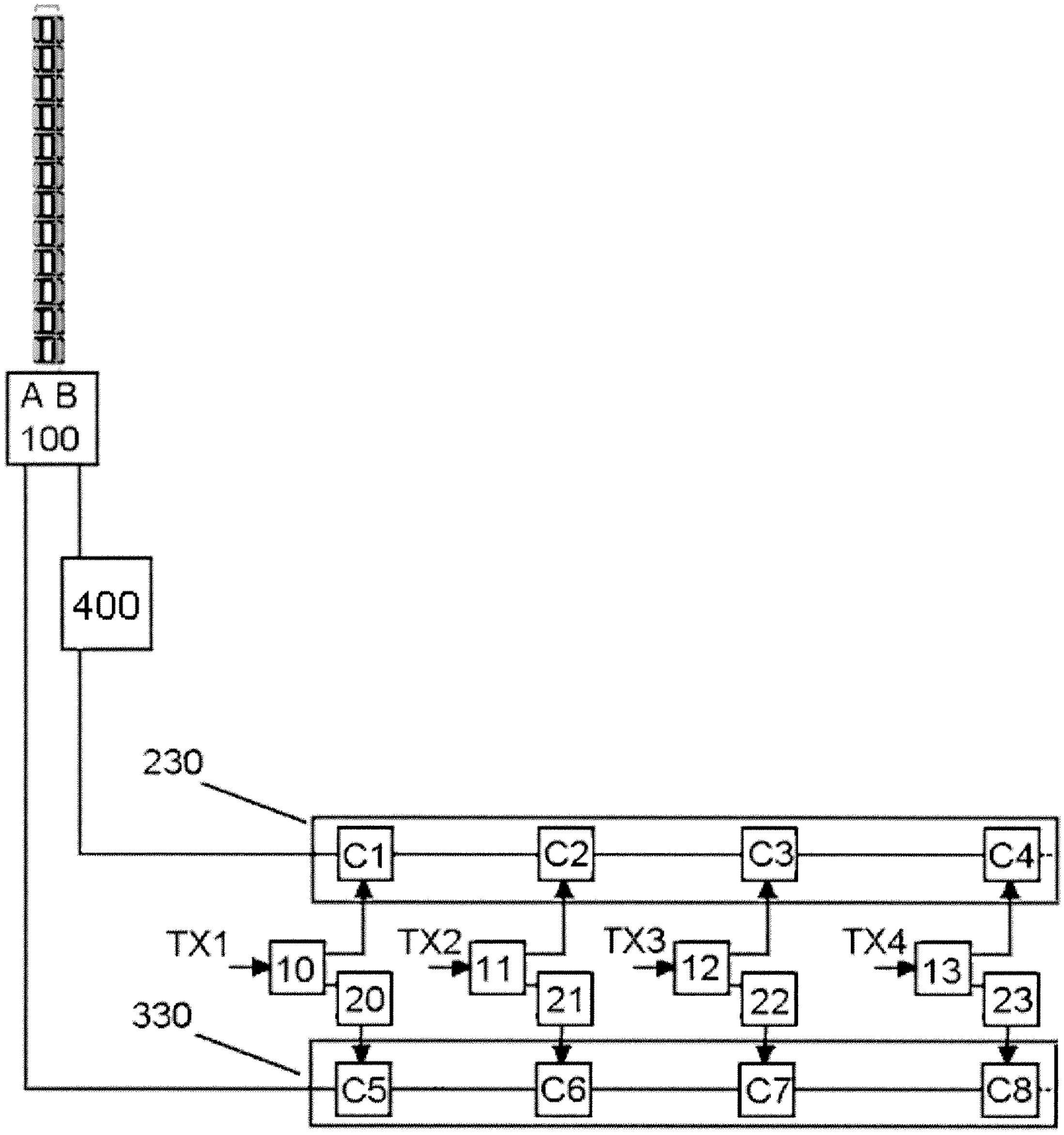
FIG. 2 schematically illustrates examples of the invention.

Another example is as follows and will be described again with respect to FIG. 2. There an exemplary set of antennas and its Connection Point 100 is shown.

The antenna set comprises one or more antennas slanted at +45 degrees with respect to the horizontal polarization and one or more antennas slanted at −45 degrees with respect to the horizontal polarization. +45 degree slanted antennas receive their signals to be transmitted via a respective port A and −45 degree slanted antennas receive their signals to be transmitted via a respective port B.

Again, an antenna may consist of one or more radiation elements.

I.e., signals originating from a first Transmitter TX1 will be combined with other signals via combiners C1 and C5. Combiner C1 combines signals to be transmitted via the −45 degree slanted antenna or set of −45 degree slanted antennas. Combiner C5 combines signals to be transmitted via the +45 degree slanted antenna or set of +45 degree slanted antennas.

In a corresponding manner signals originating from a further Transmitter TX2 may be combined with other signals via combiners C2 and C6. Combiner C2 combines signals to be transmitted via the −45 degree slanted antenna or set of −45 degree slanted antennas. Combiner C6 combines signals to be transmitted via the +45 degree slanted antenna or set of +45 degree slanted antennas.

The same may be done with signals originating from further transmitters as indicated by Transmitters TX3 and TX4 and respective combiners C3, C7 for TX3 and C4, C8 for TX4.

Signals for the +45 degree slanted antenna or set of +45 degree slanted antennas are fed via a common vertical feed towards a vertical input and (Port A) in the Connection Point 100 of the antenna while the −45 degree slanted antenna or set of −45 degree slanted antennas is fed via a common horizontal feed towards a vertical input and (Port B) in the Connection Point 100 of the antenna.

Signals supplied to the Combiners C1 and C5 are received via a Power Splitter 10 having a certain ratio. Preferably, the ratio is equal, i.e. a 50%/50% Power Splitter. The signals supplied to the Combiners C2 and C6 are received via a Power Splitter 11 having a certain ratio. Preferably, the ratio is equal, i.e. a 50%/50% Power Splitter. The signals supplied to the Combiners C3 and C7 are received via a Power Splitter 12 having a certain ratio. Preferably, the ratio is equal, i.e. a 50%/50% Power Splitter. The signals supplied to the Combiners C4 and C8 are received via a Power Splitter 14 having a certain ratio. Preferably, the ratio is equal, i.e. a 50%/50% Power Splitter.

Signals fed by a transmitter towards the Connection Point 100 may be Phase Shifted in a Phase Shifter. I.e. Signals fed by first Transmitter TX1 are split in a Power Splitter 10 and subsequently subjected to a Phase Shifter 20. Phase Shifter 20 shifts a signal portion with respect to the other such that the required polarization is attained. Signals fed by another Transmitter TX2 are split in a Power Splitter 11 and subsequently subjected to a Phase Shifter 21. Phase Shifter 21 shifts a signal portion with respect to the other such that the required polarization is attained. Signals had by Transmitter TX3 are split in a Power Splitter 12 and subsequently subjected to a Phase Shifter 22. Phase Shifter 22 shifts a signal portion with respect to the other such that the required polarization is attained. Signals fed by Transmitter TX4 are split in a Power Splitter 13 and subsequently subjected to a Phase Shifter 23. Phase Shifter 23 shifts a signal portion with respect to the other such that the required polarization is attained.

The location of the Power Splitter 10 may be nearby the Phase Shifter 20. Likewise, the location of the Power Splitter 11, 12, 13 may be nearby the respective Phase Shifter 21, 22, 23

The location of the Phase Shifter 20 may nearby the Power Splitter 10, nearby Combiner C1 and/or C5, respectively Group Combiner 230 and/or Group Combiners 330 or somewhere in between. Likewise, the location of Phase Shifter 21, 22, 23 may nearby the respective Power Splitter 11, 12, 13, nearby Combiner C2, C3, C4 and/or C6, C7, C8, respectively Group Combiner 230 and/or Group Combiners 330 or somewhere in between.

Feeding the slanted antennas with the split and phase shifted signals will cause the antenna to radiate vertically polarized and horizontally polarized components.

The ratio between these components is controlled by the respective Phase Shifter 20, 21, 22, 23.

Within this example, the polarization ratio may be set for each signal individually. I.e. signals originating from a first Transmitter TX1 may be split by the Power Splitter 10 equally and Phase shifted, leading to a circular polarization, while signals originating from another Transmitter TX2 may be split equally by the Power Splitter 11 and Phase shifted, leading to an elliptical polarization. Signals originating from Transmitter TX3 may be split by the Power Splitter 12 equally and Phase shifted, leading to a linear polarized signal, e.g. a horizontally polarized signal, while signals originating from Transmitter TX4 may be split by the Power Splitter 13 equally and Phase shifted, leading to a linear polarized signal, e.g. a vertically polarized signal. It is to be understood that the respective phase shifting is only of exemplary nature. In case only a particular polarization is needed, a respective power splitter, a respective Phase shifter and a respective unused combiner may be omitted and instead the signal may be combined with other signals of the respective feed only. Furthermore, it may also be envisaged that fixed ratio Phase Shifters may be used for certain signals while others use adjustable Phase Shifters.

As a result, any service provider may choose a polarization on its own, leading to an increase of freedom for the service providers while reducing the number of antennas which would be necessary when only a fixed ratio would be available for all.

It is envisaged that the splitting of power and phase adjustment may be combined for all types of antennas allowing for adjusting unequal transmission lengths due to different length of the respective feeds. I.e. it might happen that the Combiners are located near the respective transmitters while the feed to the antennas is long. Than it may happen that the feeds are not of the same length but differ and thereby causing an unwanted common phase shift.

This common phase shift may be compensated individually, i.e. any service provider needs to take the phase shift into account by respectively adjusting phase shifter and/or power splitter or such a phase shift may be compensated commonly, i.e. a phase shifter for all signals is introduced in one of the common feeds, e.g. Phase Shifter 400.

The invention provides for different polarization ratio for each service provider. The arrangement also allows a service provider to conveniently change the choice of polarization ratio as a result of information that may be received from research, tests and reception surveys.

Furthermore, the invention provides independent choice of polarization ratio for signal suppliers using a shared antenna site.

Figure 3:
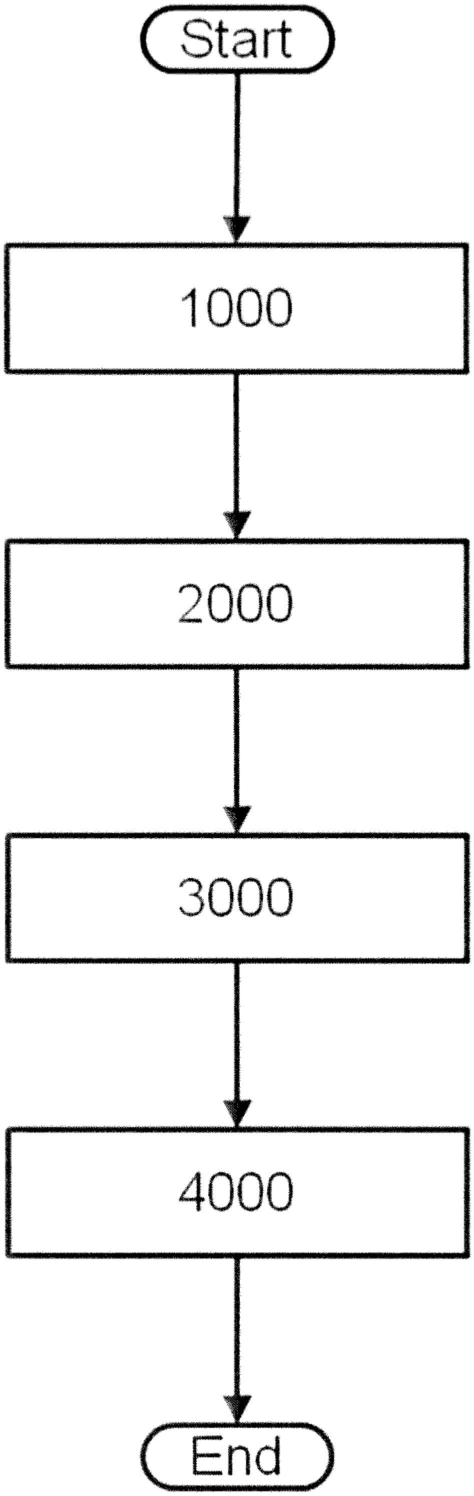
FIG. 3 shows an exemplary schematical flowchart according to examples of the invention.

FIG. 3 shows an exemplary schematical flowchart according to examples of the invention.

The method allows for providing independent polarization control in a radio communication system. The system comprises a plurality of Transmitters TX1, TX2, TX3, TX4 for supplying signals to a set of common antennas 100. Said set of common antennas 100 is used for transmitting said signals. Said set of common antennas 100 is used to provide elliptical polarization transmission of said signals. Once said method is started, in a first step 1000, a combiner C1, C2, C3, C4, C5, C6, C7, C8 for each combination of a first Transmitter TX1, TX2, TX3, TX4 of said plurality of Transmitters and an antenna of said set of common antennas 100 is provided. In a further step 200, an adjusting element 10, 11, 12, 13, 20, 21, 22, 23 allowing for controlling the polarization of the signal provided by said first Transmitter TX1, TX2, TX3, TX4 is provided.

In a further embodiment, the method comprises the step of controlling a power ratio supplied to each of said combiner C1, C2, C3, C4, C5, C6, C7, C8 by said adjusting element 10, 11, 12, 13.

In a further embodiment, the method comprises the step of controlling the polarization via controlling a phase shift supplied to one of said combiners by said adjusting element 20, 21, 22, 23.

In still a further embodiment, the signals to be combined may be subject to a further amplification. I.e. the Transmitter TX1, TX2, TX3, TX4 may provide a Low Power High Frequency signal which is than subjected to the Power Splitter and in some embodiments a Phase shifter. Thereafter, the signal is amplified to the necessary power-level and then fed into the respective combiner.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The present invention may be embodied in other specific apparatus and/or methods. The described embodiments are to be considered in all respects as only illustrative and not restrictive.

Throughout the application elliptical polarization is the most general description of polarization also encompassing special cases such as circular polarization and linear polarizations.

It should be appreciated by those skilled in the art that any block diagrams herein represent conceptual views of illustrative circuitry embodying the principles of the invention.

In particular, the scope of the invention is indicated by the appended claims rather than by the description and figures herein. All changes that come within the meaning and range of equivalency of the claims are to be embraced within their scope.

There is claimed:

1. A system for providing independent polarization control in a radio communication system, the system comprising a set of common antennas;

a plurality of transmitters for supplying signals to said set of common antennas, wherein said set of common antennas is used for transmitting said signals, and wherein said set of common antennas is used to provide elliptical polarization transmission of said signals, a plurality of combiners including a respective combiner for each combination of a respective transmitter of said plurality of transmitters and a selected antenna of said set of common antennas, wherein each respective combiner is connected to cooperate with at least one other combiner that is associated with at least one other transmitter of said plurality of transmitters and with the selected antenna to allow signals from the respective transmitter and the at least one other transmitter to be provided to the selected antenna simultaneously, and an adjusting element allowing for controlling the polarization of the signal provided by said respective transmitter.

2. The system according to claim 1, wherein said adjusting element allows for controlling the polarization via controlling a power ratio supplied to each of said respective combiner.

3. The system according to claim 1, wherein said adjusting element allows for controlling the polarization via controlling a phase shift supplied to one of said combiners.

4. The system according to claim 1, wherein the polarization is controlled in such a way that the polarization of at least one signal transmitted by the set of common antennas provides an elliptical polarization.

5. The system according to claim 1, wherein the polarization is controlled in such a way that the polarization of at least one signal transmitted by the set of common antennas provides a horizontal component and a vertical component, wherein the power of said signal in the horizontal component is about 66% and the power of said signal in the vertical component is about 33%.

6. A method for providing independent polarization control in a radio communication system, the system comprising a plurality of transmitters for supplying signals to a set of common antennas, wherein said set of common antennas is used for transmitting said signals, and wherein said set of common antennas is used to provide elliptical polarization transmission of said signals, comprising:

Providing a plurality of combiners including a respective combiner for each combination of a respective transmitter of said plurality of transmitters and a selected antenna of said set of common antennas, wherein each respective combiner is connected to cooperate with at least one other combiner associated with at least one other transmitter of said plurality of transmitters and with the selected antenna to allow signals from the respective transmitter and the at least one other transmitter to be provided to the the selected antenna simultaneously; and Providing an adjusting element allowing for controlling the polarization of the signal provided by said respective transmitter.

7. The method according to claim 6, further comprising:

controlling a power ratio supplied to each of said combiner by said adjusting element.

8. The method according to claim 6, further comprising:

controlling the polarization via controlling a phase shift supplied to one of said combiners by said adjusting element.

9. A system for providing independent polarization control in a radio communication system, the system comprising:

a plurality of transmitters for supplying signals to an associated set of common antennas, wherein said associated set of common antennas is used for transmitting said signals, and wherein said associated set of common antennas is used to provide elliptical polarization transmission of said signals, a plurality of combiners including a respective combiner for each combination of a respective transmitter of said plurality of transmitters and a selected antenna of said associated set of common antennas, wherein each respective combiner is connected to cooperate with at least one other combiner that is associated with at least one other transmitter of said plurality of transmitters and with the selected antenna to allow signals from the respective transmitter and the at least one other transmitter to be provided to the selected antenna simultaneously, and an adjusting element allowing for controlling the polarization of the signal provided by said respective transmitter.

* * * * *